UNITED STATES PATENT OFFICE.

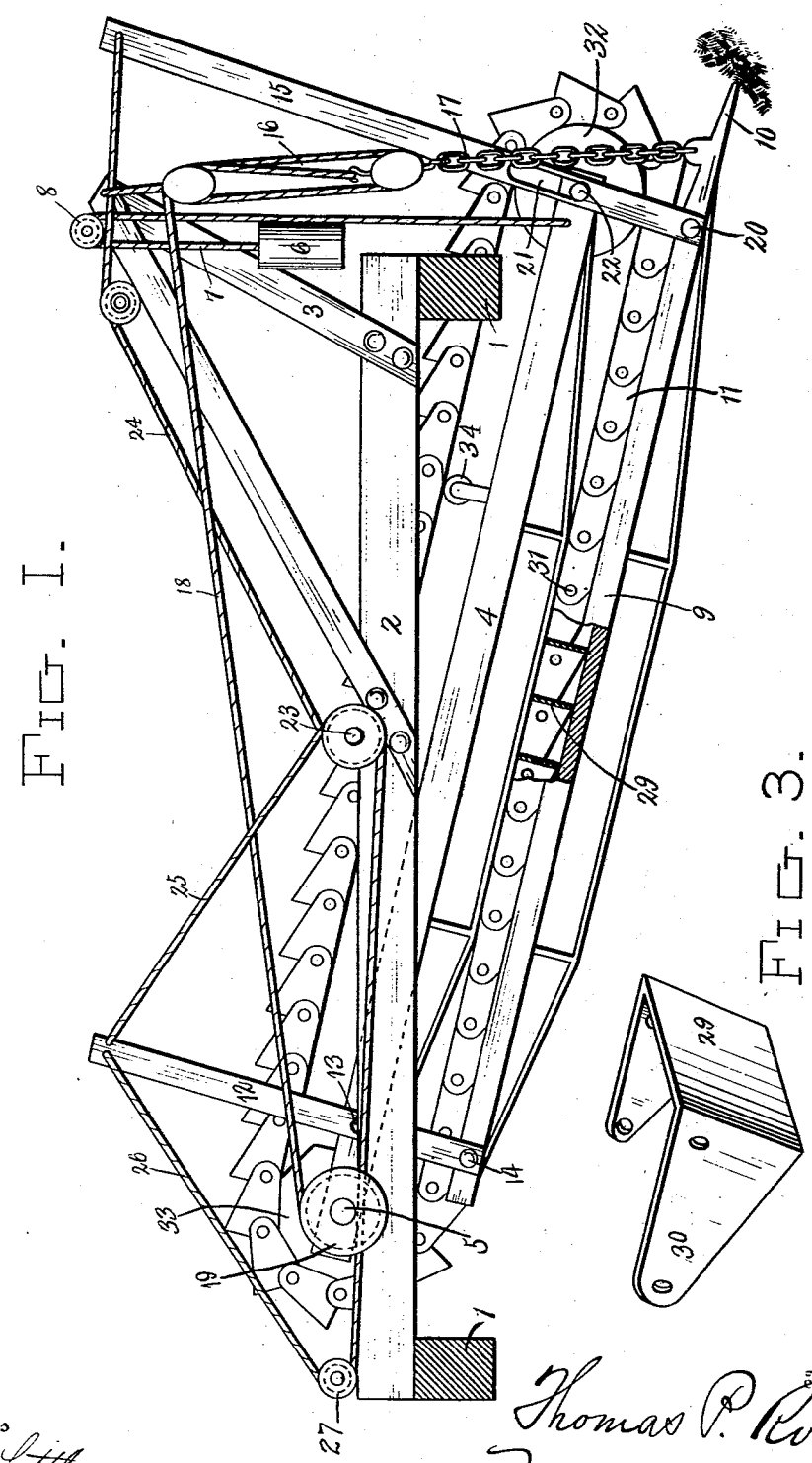

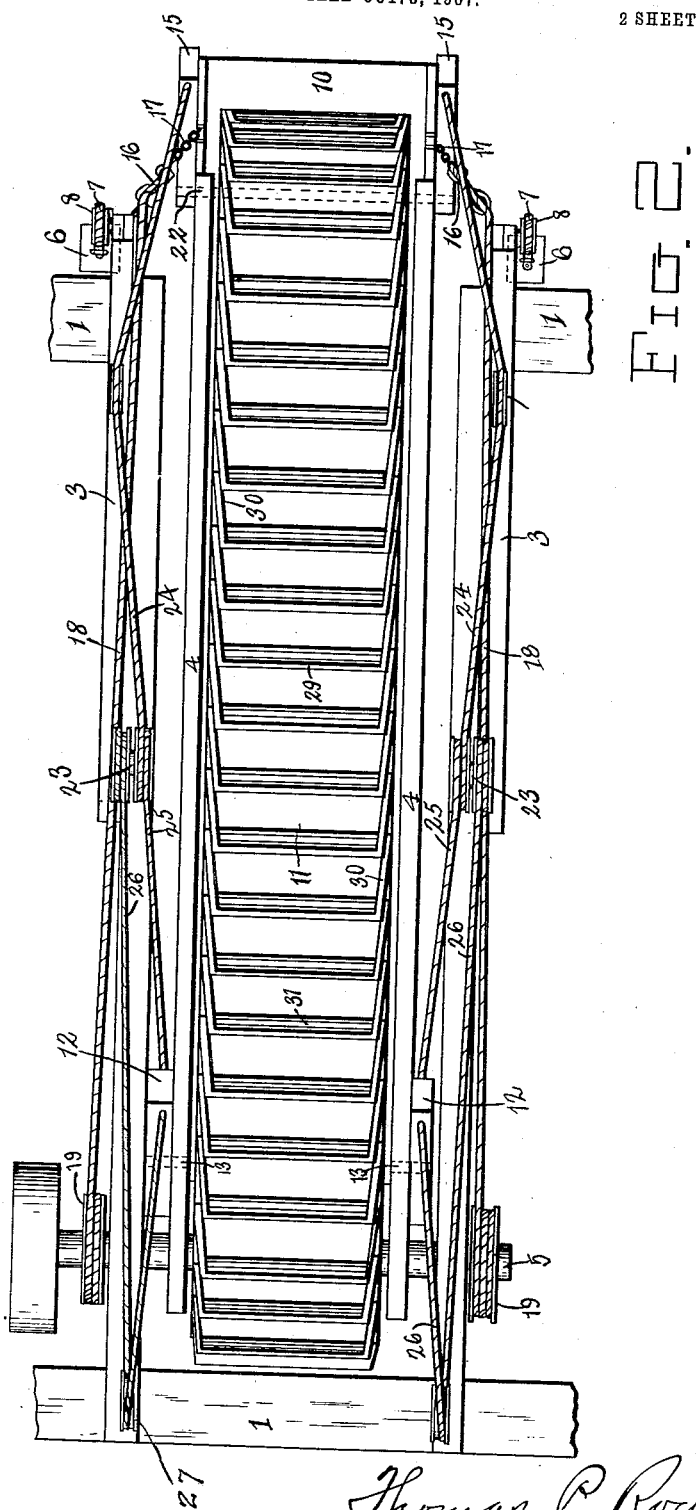

THOMAS P. ROCHFORD, OF SEATTLE, WASHINGTON.

EXCAVATOR.

No. 886,729.  Specification of Letters Patent.  Patented May 5, 1908.

Application filed October 3, 1907. Serial No. 395,712.

*To all whom it may concern:*

Be it known that I, THOMAS P. ROCHFORD, a citizen of the United States, residing at Seattle, in the county of King and State of Washington, have invented certain new and useful Improvements in Excavators, of which the following is a specification, reference being had to the accompanying drawings.

My invention relates to improvements in excavators and dredges, and consists of the novel construction and the combination and arrangement of devices hereinafter described and claimed.

The object of the invention is to provide an apparatus of this character with improved means for mounting and operating the excavating and elevating mechanism and thereby greatly increase the efficiency of the apparatus.

A further object of the invention is to improve and simplify the construction and operation of the excavators and dredges and thereby render the same less expensive and more durable and efficient.

The above and other objects which will appear as the nature of the invention is better understood, are attained in the construction illustrated in the accompanying drawings, in which Figure 1 is a side elevation of my improved excavator or dredge, parts broken away and in section; Fig. 2 is a top plan view of the same; and Fig. 3 is a detail perspective of one of the scoop or bucket members of the endless elevator.

My improved excavating and dredging apparatus comprises a main frame 1 which is adapted to be mounted upon a suitable support in the form of a wheeled truck adapted to be moved over the ground or in the form of a scow or similar body adapted to float upon water. The frame 1 comprises a horizontal portion 2 and a vertical portion 3 arranged at one end of the horizontal portion.

Arranged within the horizontal portion 2 of the frame is a vertically swinging frame consisting of suitably connected side bars 4 having their upper ends pivotally suspended from a transverse shaft 5 journaled in suitable bearings upon the side bars of the main frame 1. The lower free end of the swinging frame may be supported in any suitable manner but I preferably counterbalance the same by providing counterbalancing weights 6 upon the ends of cables 7 which are passed over guide pulleys 8 upon the vertical portion 3 of the main frame and have their lower ends attached to the side bars 4.

The swinging frame supports the excavating and elevating mechanism which comprises a trough or box 9 having a digging shovel or nose 10 at its lower end, and an endless elevator 11. The trough 9 is supported in a downwardly and forwardly inclined position beneath the endless elevator so that the lower stretch of the latter will move upwardly through the same and carry the material loosened by the shovel 10 upwardly and out of its rear end from which said material is dropped into a suitable conveyer (not illustrated). Said trough is suspended at its rear end by a pair of upright levers 12 pivoted intermediate their ends at 13 on the side bars 4 of the swinging frame and having their lower ends pivoted at 14 upon the sides of the trough. The front and lower end of the latter is suspended by a pair of similar levers 15 and also by an adjusting means consisting of a block and tackle 16 arranged upon each side of the apparatus and suspended from the upright portion 3 of the main frame. The lower end of each block and tackle is connected by a chain or the like 17 to an ear upon one side of the shovel 10, and the cables 18 of the same are connected to a drum or drums 19 arranged upon the shaft 5 or otherwise located within convenient reach of an operator. The front levers 15 have their lower ends pivoted at 20 upon the opposite sides of the trough or its shovel and in their intermediate portions are formed longitudinal slots 21 to receive the ends of a transverse shaft 22 arranged in the lower ends of the side bars 4 of the swinging frame. The ends of the shaft 22 form pivots for the levers 15 and the provision of the slots 21 enables the levers to have a limited sliding movement as well as a swinging movement. This sliding movement is provided to allow the swinging frame 4 and the elevator which it carries to rise and fall within the trough 9 whenever large stones enter said trough, and it permits said swinging frame to adjust itself vertically so that its lower working stretch or run will normally contact the bottom of the trough and elevate the material therein.

The levers 12 and 15 not only serve as suspending means for the trough 9 but also as means whereby it may be oscillated or swung longitudinally, that is in a forward and rearwardly direction, for the purpose of causing its nose or shovel 10 to dig into the bed of a body of water or into the side of a bank or hill. While any suitable means may be provided for oscillating the levers to swing said trough, I preferably employ a plurality of winding drums 23 adapted to be operated by an engine or other motor. I also provide three cables 24, 25, 26, which are operated by the drums 19, the cables 24 leading to the upper ends of the levers 15, cables 25 leading to the upper ends of the levers 12 and the cables 26 being passed over guide pulleys 27 arranged in rear of the levers 12 and then attached to the latter as clearly shown in the drawings. While the foregoing is the preferred arrangement of the cables it will be understood that any other arrangement may be provided for the purpose of oscillating the levers.

The endless elevator is in the form of a chain composed of a plurality of scoop or bucket members 29 of substantially U-shape as more clearly shown in Fig. 3. These scoops have tapered arms 30 adapted to overlap the closed end of the next adjacent scoop to which they are pivoted by transverse pivots 31. By constructing the scoops or buckets in this manner it will be seen that they will scoop or drag the material loosened by the shovel 10 upwardly through the trough 9. The elevator passes over a guide wheel or drum 32 arranged upon the shaft 22 and also over a driving wheel or drum 33 fixed upon the shaft 5 and provided with flat faces which engage the inner edges of the scoops or buckets 29 and prevent the chain from slipping when power is applied to the shaft 5 for the purpose of driving the elevator. The upper stretch or run of the elevator is preferably supported by rollers 34 suitably journaled upon the side bars of the swinging frame.

In use, the main frame is suitably supported as above mentioned in position to operate upon the bed of a body of water or an embankment or the like, and its support is movable so that it can be moved forwardly as it cuts its way into the bed or embankment. When the main frame is properly positioned the block and tackle 16 is operated to adjust the digging shovel 10 at the desired elevation and the elevator 11 is then set in operation. By properly winding and unwinding the cables 24, 25, 26 the levers 12, 15 will be oscillated to oscillate or swing the trough 9 and cause its shovel 10 to dig and loosen the material to be elevated. As this material is loosened the scoops of the elevator engage it and drag it up through the trough as above stated. Owing to counterbalancing of the swinging elevator carrying the frame and to its sliding connection with the front suspending and operating levers 15 it will be seen that the lower stretch of the elevator will yield whenever it meets with an obstruction and also as the trough 9 is raised and lowered in its swinging movement.

While I have shown and described in detail the preferred embodiment of my invention, it will be understood that I do not wish to be limited to the precise showing as herein set forth and that various changes in the form, proportion and details may be resorted to within the scope of the invention.

Having thus described my invention what I claim is:

1. In an apparatus of the character described, an elevator trough having a digging shovel and means for oscillating said trough.

2. In an apparatus of the character described, an elevator trough having a digging shovel and levers for suspending and operating said trough.

3. In an apparatus of the character described, an elevator trough having a digging shovel, means for suspending said trough for swinging movement and means for swinging or oscillating said trough.

4. In an apparatus of the character described, an elevator trough having a digging shovel, means for suspending said trough for swinging movement, levers for actuating said trough, and means for operating said levers.

5. In an apparatus of the character described, an elevator trough having a digging shovel, levers for suspending and oscillating said trough and cables attached to said levers for oscillating the same.

6. In an apparatus of the character described, an elevator trough having a digging shovel and mounted for oscillatory movement and an elevating mechanism arranged in said trough.

7. In an apparatus of the character described, an elevator trough having a digging shovel and mounted for oscillatory movement, an elevating mechanism and means for yieldably suspending said mechanism in said trough.

8. In an apparatus of the character described, an elevator trough having a digging shovel and mounted for oscillatory movement, an endless elevator to travel through said trough, a support for the elevator pivoted at one end means for yieldably supporting its other end.

9. In an apparatus of the character described, an elevator trough having a digging shovel and mounted for oscillatory movement, an endless elevator to travel through said trough, a support for the elevator pivoted at one end and a counterbalancing device for yieldably supporting its other end.

10. In an apparatus of the character described, an elevator trough having a digging shovel and mounted for oscillatory movement, a swinging frame, means for counterbalancing the free end of said frame and an endless elevator mounted upon said swinging frame and having its lower stretch arranged to travel upwardly through the trough.

11. In an apparatus of the character described, a main frame or support, a swinging frame thereon, an endless elevator upon the swinging frame, an elevator trough to receive the elevator and provided with a digging shovel, means for suspending and oscillating said trough and means for adjusting the lower end of said trough vertically.

12. In an apparatus of the character described, a main frame or support, a swinging frame thereon, an endless elevator upon the swinging frame, an elevator trough to receive the elevator and provided with a digging shovel, levers for suspending and oscillating said trough, said levers being pivoted upon the swinging frame, the levers at the lower end of the latter being loosely pivoted for sliding movement, and means for adjustably supporting the lower end of the trough.

13. In an apparatus of the character described, a main frame or support, a swinging frame thereon, an endless elevator upon the swinging frame, an elevator trough to receive the elevator and provided with a digging shovel, means for counterbalancing the lower end of the swinging frame and means for adjustably supporting the lower end of the trough.

14. In an apparatus of the character described, a main frame, a vertically swinging frame thereon, means for counterbalancing the swinging frame, an endless elevator upon the swinging frame and a trough arranged beneath said elevator.

15. In an apparatus of the character described, a main frame, a vertically swinging frame thereon, an endless elevator upon the swinging frame, a swinging trough beneath said elevator and provided with a digging shovel and a lever for oscillating said trough.

16. In an apparatus of the character described, a main frame, an endless elevator, a swinging trough arranged beneath said elevator and provided with a digging shovel and a lever for oscillating said trough.

In testimony whereof, I hereunto affix my signature in the presence of two witnesses.

THOMAS P. ROCHFORD.

Witnesses:
ALFRED E. PARKER,
A. W. ROCHFORD.